(12) United States Patent
Berry

(10) Patent No.: US 10,788,191 B1
(45) Date of Patent: Sep. 29, 2020

(54) POWER TRACK AND METHOD OF MOUNTING AND CONNECTING A LIGHT MODULATOR TO SUPPORTED LUMINAIRES

(71) Applicant: UNIVERSAL LIGHTING TECHNOLOGIES, INC., Madison, AL (US)

(72) Inventor: Travis L. Berry, Madison, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 0 days.

(21) Appl. No.: 16/141,571

(22) Filed: Sep. 25, 2018

Related U.S. Application Data

(60) Provisional application No. 62/565,621, filed on Sep. 29, 2017.

(51) Int. Cl.
| | |
|---|---|
| *F21V 17/10* | (2006.01) |
| *H01R 25/14* | (2006.01) |
| *F21V 21/34* | (2006.01) |
| *F21V 21/35* | (2006.01) |

(52) U.S. Cl.
CPC .......... *F21V 17/101* (2013.01); *F21V 21/35* (2013.01); *H01R 25/142* (2013.01)

(58) Field of Classification Search
CPC .......... F21S 8/038; F21S 8/066; F21V 17/10; F21V 17/101; F21V 23/06; F21V 21/34; H01R 25/142; H01R 25/147
See application file for complete search history.

(56) References Cited

U.S. PATENT DOCUMENTS

| | | | | |
|---|---|---|---|---|
| 4,655,520 A | * | 4/1987 | Cummings | F21V 21/002 439/111 |
| 4,688,154 A | * | 8/1987 | Nilssen | F21V 21/35 307/157 |
| 5,140,507 A | * | 8/1992 | Harwood | F21S 8/038 248/278.1 |
| 6,033,097 A | * | 3/2000 | Harwood | F21V 21/34 362/404 |
| 6,246,182 B1 | * | 6/2001 | Yamasaki | H05B 39/00 315/209 R |
| 6,439,749 B1 | * | 8/2002 | Miller | F21S 8/02 362/239 |
| 2002/0137374 A1 | * | 9/2002 | O'Rourke | F21V 23/02 439/121 |
| 2006/0039168 A1 | * | 2/2006 | Mier-Langner | F21S 8/038 362/648 |
| 2014/0184097 A1 | * | 7/2014 | Luk | H05B 37/0254 315/297 |

* cited by examiner

*Primary Examiner* — Thai Pham
(74) *Attorney, Agent, or Firm* — Patterson Intellectual Property Law, P.C.; Gary L. Montle; Alex H. Huffstutter

(57) ABSTRACT

A light fixture, and lighting systems and methods, are provided for selectively receiving one of a modulator or a jumper plug at a connector port of the light fixture. The connector port is coupled between and electrically isolates a driver and a light emitting unit of the light fixture. The modulator, when connected to the connector port, is configured to receive unmodulated power from the driver and to provide modulated power to the light emitting unit. The jumper plug, when connected to the connector port, is configured to provide unmodulated power from the driver to the light emitting unit.

14 Claims, 4 Drawing Sheets

POWER TRACK AND METHOD OF MOUNTING AND CONNECTING A LIGHT MODULATOR TO SUPPORTED LUMINAIRES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/565,621, filed Sep. 29, 2017, entitled "Power Track and Method of Mounting and Connecting a Light Modulator to Supported Luminaires," and which is hereby incorporating by reference.

FIELD OF THE INVENTION

The present disclosure relates generally to lighting fixtures. More particularly, the present disclosure pertains to a lighting fixture for retrofit coupling to a modulator or jumper plug, a lighting fixture of a track lighting system for retrofit coupling to a modulator or jumper jump, and a method of coupling a modulator to a lighting fixture.

BACKGROUND

A conventional track lighting system 100 without modulation capabilities is shown in FIGS. 1 and 2. The track lighting system 100 includes a power track 102 with a mounting interface. The power track 102 delivers power to at least one lighting fixture 110 coupled to the power track 102. The light fixture 110 may also be referred to herein as a luminaire 110. The power track 102 is typically made from extruded metal or plastic and includes electrical conductors (not shown) that are accessible by the lighting fixture 110. In the United States, the three most common track systems are configured as H, J, and L shapes.

As shown in FIG. 2, each lighting fixture 110 includes a housing 112. Each lighting fixture 110 further includes a driver 120 and a light emitting unit 130, which are both enclosed within the housing 112. The housing 112 is physically connected to the power track 102. The driver 120 is electrically connected to the electrical conductors within the power track 102. The driver 120 is coupled to the light emitting unit 130 via a plurality of lead lines 140. Each lead line 140 is coupled at a first end to a driver output terminal 122 and is coupled at a second end to a light emitting unit input terminal 132. The lead lines 140 are configured to provide a constant electrical connection from the driver output terminals 122 to the light emitting unit input terminals 132.

Modulation of light makes possible "loading" of the luminous flux with information, which is then transmitted by the light and can be extracted and used. Solid-state light modulation is just beginning to appear on the market. Light modulators generally support two main user applications. The more developed application is to convey a unique address to a mobile device. This is currently used in sports facilities, retail establishments, and the like. In such applications the mobile device has software (e.g., a smart phone application) that enables receipt of a unique ID that is transmitted via modulation of the light. The device is responsive to a received modulation signal to take a predefined action, such as opening a retailer's website. The less-developed application is LiFi, which uses light modulation to convey large amounts of data at high speed.

Modulation of light is typically implemented by inserting a device (e.g., a modulator or modulator circuitry) between a driver and a light unit, also known as an LED load.

Fixture manufacturers invest heavily in the design of light fixtures. Interior size constraints of popular low-profile light fixtures may make it difficult for fixture manufacturers to add modulation capabilities to the light fixtures. In order to add modulation functionality, such manufacturers often must redesign these popular lower profile products to accommodate the additional modulator circuitry. Such an approach can be quite expensive for fixture manufacturers because it may require modified or new production tooling. This approach can also change the size and therefore the design of popular lower profile products which may have a negative effect on customer appeal.

From a business strategy standpoint, fixture manufacturers must grapple operational and financial efficiency when balancing the desire to minimize the design size of the light fixtures for aesthetic reasons and the need for added modulation capabilities. One solution is for fixture manufacturers to have separate fixture design lines for fixtures without modulation capabilities and for fixtures with modulation capabilities. Such a solution is not operationally nor financially efficient as such a situation would require additional design work and tooling for production.

BRIEF SUMMARY

What is needed, then, is a light fixture design that will allow fixture manufacturers to design, manufacture, and supply a given lighting fixture having a first configuration with modulation capabilities and a second configuration without modulation capabilities. The lighting fixture itself, in either the first or second configuration, is identical and does not need internal spatial accommodation for a modulator or modulator circuitry because the modulator or modulation circuitry is located externally relative to the light fixture. Such a light fixture has the added benefit of being modular and being updatable due to the location and optionally of the modulator. Accordingly, the modulator may be easily swapped for an updated and upgraded modulator without having to replace the entire light fixture.

The disclosed embodiments modify the wiring inside any given fixture and add a connection port to the fixture. The wiring inside the fixture, which connects the driver and the light emitting unit, is modified to be connected to the connection port. The modified wiring of the disclosed embodiments electrically isolates the driver and the light emitting unit. In order to electrically connect the driver and the light emitting unit, the disclosed embodiments connect either a jumper plug for unmodulated electrical connection or a modulator for modulated electrical connection to the connector port. Aspects of the disclosed embodiment provide systems, fixtures, and methods for selectively coupling a modulator to a light fixture to enable modulation capabilities or coupling a jumper plug to the light fixture to disable modulation capabilities.

In one aspect, a light fixture coupleable to a track lighting system is disclosed. The light fixture includes a housing, a connector port, a driver, and a light emitting unit. The housing is mechanically coupleable to the track power system. The connector port is coupled to the housing. The connector port has input terminals and output terminals. The connector port is configured to electrically isolate the input terminals from the output terminals. The driver is positioned within the housing. The driver has a driver input and a driver output. The driver input is electrically coupleable to the track power system and configured to receive an input voltage from the track power system. The driver output is coupled to the output terminals of the connector port. The light emitting unit is coupled to the housing. The light emitting unit has a light emitting unit input coupled to the input terminals of the connector port.

In accordance with this aspect the connector port is configured to selectively receive one of a light modulator or a jumper plug to couple the input terminals to the output terminals.

In accordance with this aspect the jumper plug includes jumper plug input terminals and jumper plug output terminals. Each jumper plug input terminal is coupled to a respective jumper plug output terminal.

In accordance with this aspect the jumper plug is configured to provide a constant electrical connection between the driver and the light emitting unit.

In accordance with this aspect the modulator includes a modulator input coupleable to the output terminals and a modulator output coupleable to the input terminals. The modulator input is configured to receive electrical power from the driver output. The modulation output is configured to provide modulated electrical power to the light emitting unit.

In accordance with this aspect the modulator is configured to modulate light emitted from the light emitting unit.

In accordance with this aspect the modulator is directly coupled to the connector port.

In accordance with this aspect the modulator is coupled to the connector port via a cable.

In accordance with this aspect the modulator is mechanically supported by the track lighting system.

In another aspect, a lighting system having a light fixture and a jumper plug is disclosed. The light fixture has a connector port coupled to a set of driver output terminals and to a set of load input terminals. The jumper plug is configured to engage the connector port in order to provide a constant electrical connection between the driver output terminals and the load input terminals.

In accordance with this aspect the jumper plug is removable and replaceable with a modulator. The modulator is configured to provide a modulated electrical connection to the load input terminals.

In accordance with this aspect the modulator engages the connector port. The modulator has a set of modulator input terminals and a set of modulator output terminals. The set of modulator input terminals are coupleable to the driver output terminals at the connector port. The set of modulator output terminals are coupleable to the load input terminals at the connector port.

In another aspect, a lighting system having a light fixture and a modulator is disclosed. The light fixture has a connector port coupled to a set of driver output terminals and to a set of load input terminals. The modulator is coupleable to the connector port. The modulator is configured to receive unmodulated power from the driver output terminals and to provide modulated power to the load input terminals.

In accordance with this aspect the modulator is removable and replaceable with a jumper plug. The jumper plug configured to provide unmodulated power from the driver output terminals to the load input terminals.

In accordance with this aspect the jumper plug includes a set of jumper plug input terminals and a set of jumper plug output terminals. Each jumper plug input terminal is directly electrically connected to a respective jumper plug output terminal.

In accordance with this aspect the jumper plug input terminals are coupleable to the driver output terminals at the connector port. The jumper plug output terminals are coupleable to the load input terminals at the connector port.

In accordance with this aspect the modulator has a set of modulator input terminals and a set of modulator output terminals. The set of modulator input terminals are coupleable to the driver output terminals. The set of modulator output terminals are coupleable to the load input terminals.

In another aspect, a method of adding modulation capabilities to a light fixture is disclosed. The method includes the steps of (a) unplugging a jumper plug from a connector port of the light fixture; and (b) plugging in a modulator into the connector port of the light fixture.

In accordance with this aspect the connector port electrically isolates an electrical driver of the light fixture from a load of the light fixture.

In accordance with this aspect the connector port is coupled to driver output terminals and load input terminals.

In accordance with this aspect prior to unplugging the jumper lug in step (a), the jumper plug provides direct and constant electrical connection between the driver output terminals and the load input terminals.

In accordance with this aspect step (b) further includes: routing the driver output terminals of the connector port into modulator input terminals of the modulator; and routing modulator output terminals of the modulator into the load input terminals of the connector port.

DETAILED DESCRIPTION

Figure 1:
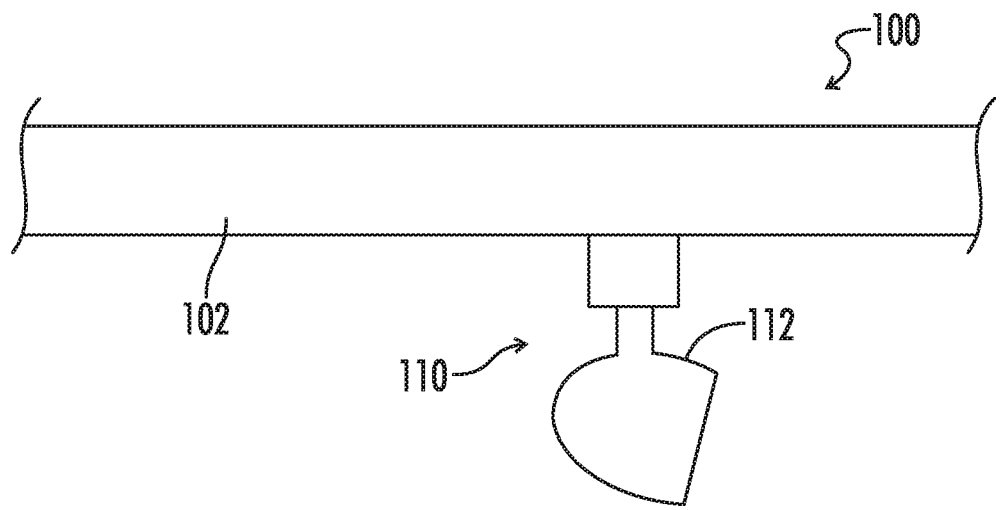
FIG. 1 is a schematic of a conventional track lighting system showing a section of a lighting track with a fixture mounted on the track.
Figure 2:
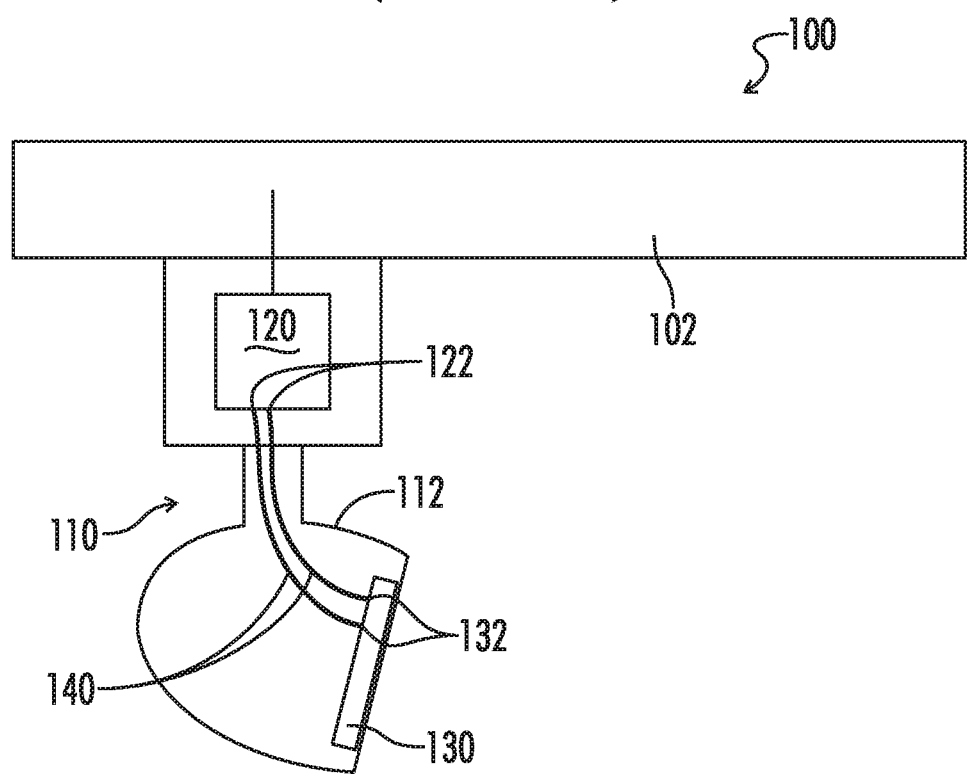
FIG. 2 is a schematic of the conventional track lighting system of FIG. 1 with a driver and a light emitting unit shown.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Where the various figures may describe embodiments sharing various common elements and features with other embodiments, similar elements and features are given the same or similar reference numerals and redundant description thereof may be omitted below.

Figure 3:
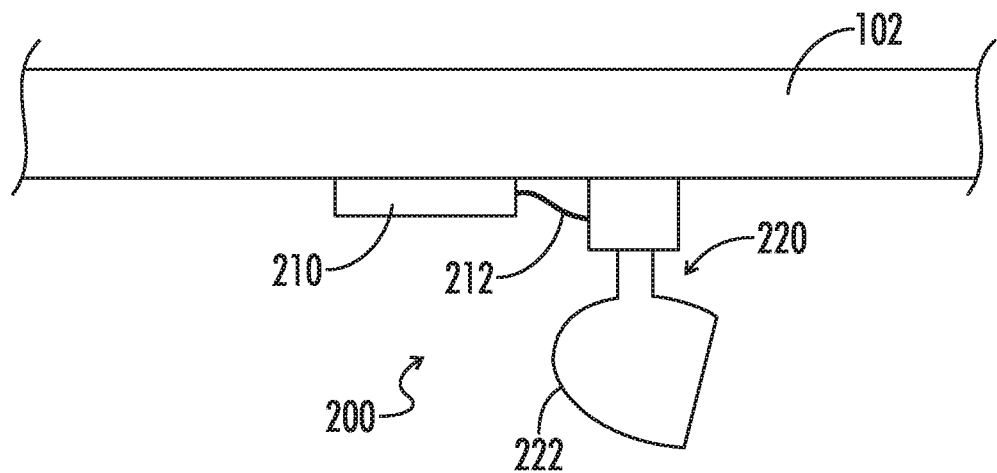
FIG. 3 is a schematic of an improved lighting system having a light fixture coupled to a power track and a modulator coupled to the light fixture via a wire in accordance with an embodiment of the present invention.
Figure 4:
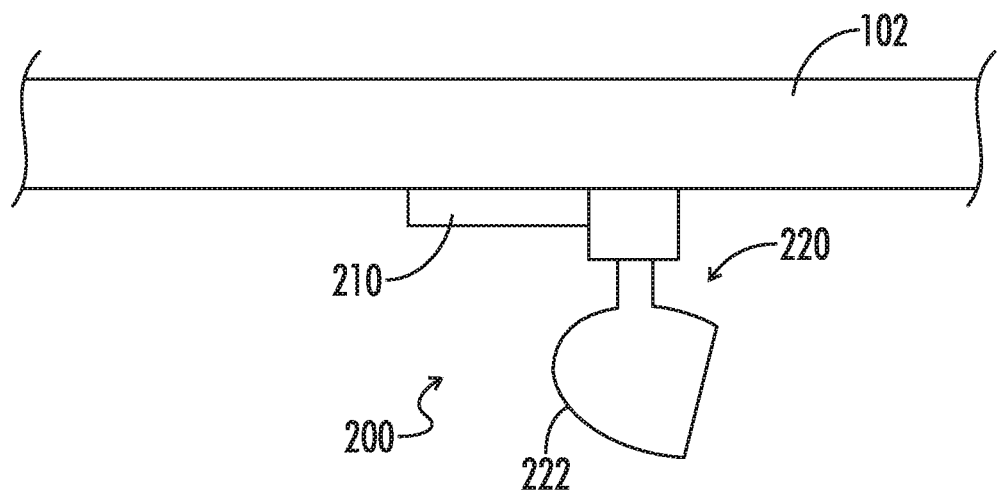
FIG. 4 is a schematic of the improved lighting system and power track of FIG. 3 having the modulator coupled directly to the light fixture.

FIGS. 3-6 illustrate a lighting system 200 with modulation capabilities. As shown in FIGS. 3-6, the lighting system 200 is coupled to the power track 102, as described above. The lighting system 200 includes at least a modulator 210 and a light fixture 220. The modulator 210 may also be referred to herein as a light modulator 210. As shown in FIG. 3, the modulator 210 is coupled to the light fixture 202 using a cable 212 connected to a set of modulator input terminals 214 (FIG. 5) and to a set of modulator output terminals 216 (FIG. 5) of the modulator 210. For example, the cable 212 may comprise four wires and each set of terminals 214, 216 may comprise two terminals. As shown in FIG. 4, the modulator 210 is directly coupled to the light fixture 220 such that the input terminals 214 and the output terminals 216 of the modulator 210 are connected directly to the light fixture 220.

The light fixture 220 includes a housing 222 configured to mechanically connect the light fixture 220 to the power track 102. The modulator 210 is also configured to mechanically connect to the power track 102. Although not shown, the modular 204 may also be electrically connected to the power track 102 in order to power certain internal functionalities of the modulator 204 if necessary.

Figure 5:
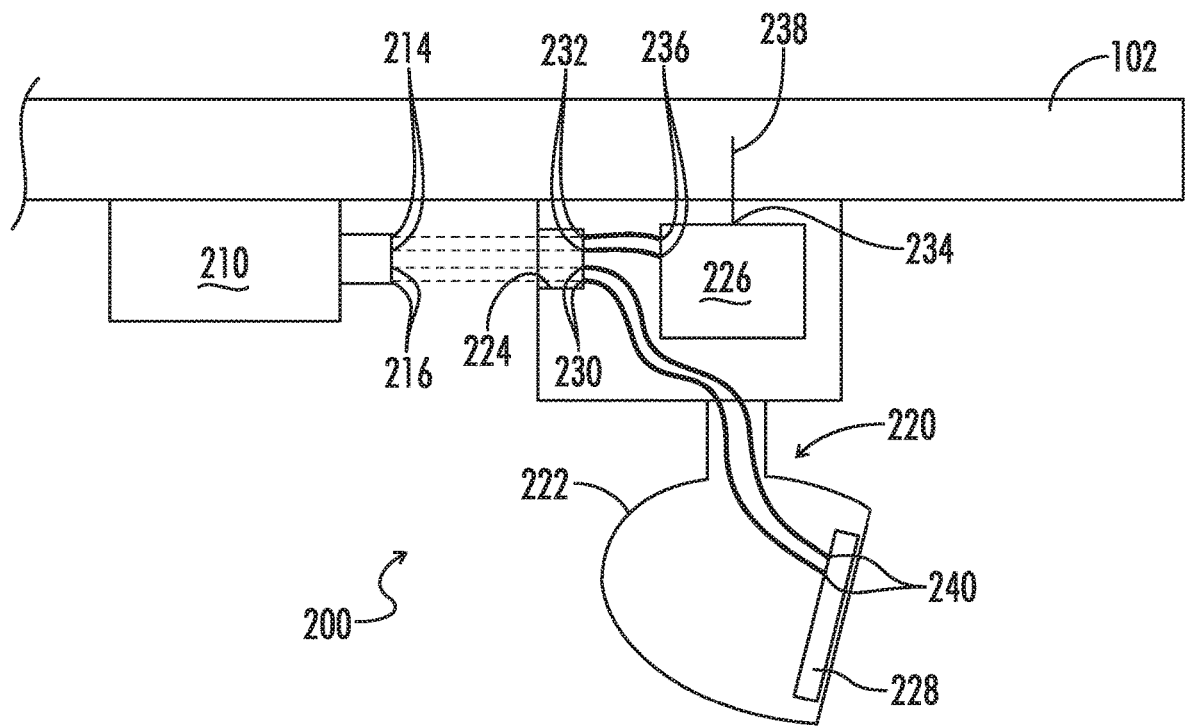
FIG. 5 is a wiring schematic of the improved lighting system of FIGS. 3 and 4 with the modulator displaced from the light fixture.
Figure 6:
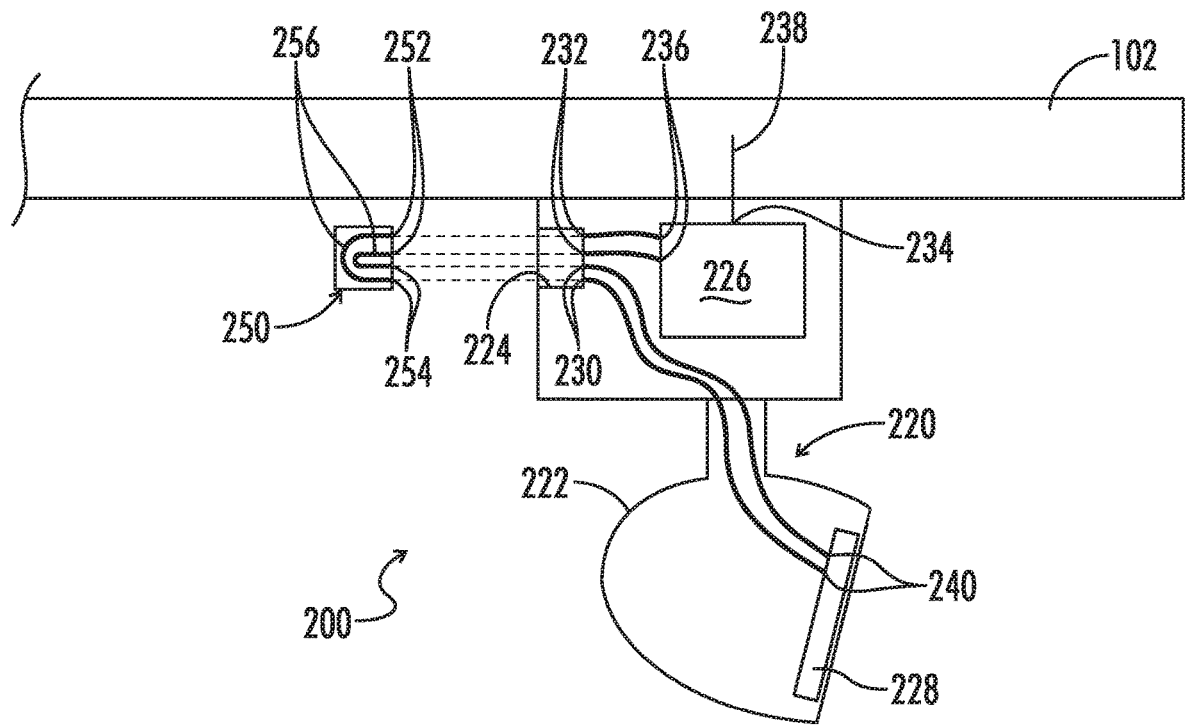
FIG. 6 is a wiring schematic of the improved lighting system of FIGS. 3 and 4 with a jumper plug replacing the modulator, the jumper plug shown displaced from the light fixture.
Figure 7:
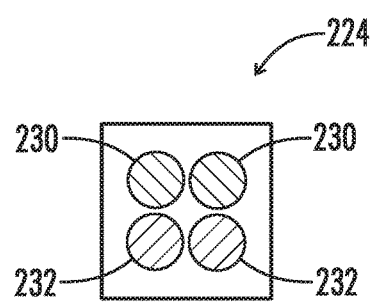
FIG. 7 is a schematic of an input and output pattern of a connector port of the light fixture of FIGS. 3-6.

As shown in FIGS. 5 and 6, the light fixture 220 further includes a connector port 224, a driver 226, and a light emitting unit 228. The light emitting unit 228 may also be referred to herein as a load 228. The connector port 224 is coupled to the housing 222. The connector port 224 includes a set of connector port input terminals 230 and a set of connector port output terminals 232. The connector port input terminals 230 are electrically isolated from the connector port output terminals 232. A pattern of the connector port input and output terminals 230, 232 is shown in FIG. 7. Although illustrated as a square pattern, other patterns for the connector port input and output terminals 230, 232 are possible (e.g., a straight pattern, an offset pattern, or the like).

As shown in FIGS. 5 and 6, the driver 226 is positioned within the housing 222. The driver 226 may be a constant current driver, or other compatible light emitting diode (LED) driver. The driver 226 includes a driver input 234 and a driver output 236. Each of the driver input and output 234, 236 may include multiple terminals. The driver 226 is configured to produce unmodulated power at the driver output 236. The driver input 234 may be electronically coupled to the power track 102 as signified by an input power lead line 238. One skilled in the art will appreciate that the power lead line 238 may comprise tabs on other wireless connectors. The input power lead line 238 is coupleable between an input voltage bus (not shown) of the power track 102 and the driver input 234. The driver output 236 is coupled to the connector port output terminals 232.

The light emitting unit 228 (e.g., an array of LEDs) is coupled to the housing 222. The light emitting unit 228 includes a light emitting unit input 240. The light emitting unit input 240 may also be referred to herein as load input terminals 240. The LEDs (not shown) of the light emitting unit 228 may be an array of one or more LEDs, arranged in series and/or in parallel. In certain embodiments, the LEDs of the light emitting unit 228 may be replaceable with other light emitting loads (not shown). The light emitting unit input 240 is coupled to the connector port input terminals 230.

As shown in FIGS. 5 and 6, the lighting system 200 includes at least one of the modulator 210 (FIG. 5) or a jumper plug 250 (FIG. 6) coupled to the connector port 224. Each of the modulator 210 and the jumper plug 250 are removably coupleable to the connector port 224 of the light fixture 220 depending on the particular needs of a user.

As shown in FIG. 5, the lighting system 200 includes the modulator 210 and the light fixture 220. The modular 210 is coupleable to the connector port 224 either directly or using the cable 212 to provide a modulated electrical connection to the light emitting unit input 240. The modulator input terminals 214 are coupleable to the connector port output terminals 232, and the modulator output terminals 216 are coupleable to the connector port input terminals 230. Accordingly, the modulator 210 is configured to receive unmodulated power from the driver output 236 and to provide modulated power to the light emitting unit input 240. The modulator 210 is configured to modulate emitted light from the light emitting unit 228.

The particular modulator 210 may be implemented in accordance with the needs of a user. Any type of modulator may be coupled to the light fixture 220 at the connector port 224. For example, in certain embodiments the modulator 210 may implement a solid-state spatial light modulation technology. Solid-state spatial light modulation operates to manipulate the amplitude, the phase, the frequency, the polarization, or a combination thereof of the power provided to a light source. Another example of a potential light modulation technology that may be implemented by the modulator 210 is light fidelity (Li-Fi) modulation for wireless or visible light communications. Visible light communication works by switching the current to LEDs at very high rate that is too quick to be noticed by the human eye. The modulation is perceivable by an electronic device (not shown) and may be configured to provide information to the device in a known manner. Although only two examples of potential light modulation technologies are mentioned, neither the lighting system 200 nor the light fixture 220 is meant to be limited by the aforementioned examples. Thus, the light fixture 220 may be coupled to any compatible modulator implementing a light modulation technology.

As shown in FIG. 6, the jumper plug 250 replaces the modulator 210 as shown in FIG. 5. The jumper plug 250 includes a set of jumper plug input terminals 252 and a set of jumper plug output terminals 254. Each jumper plug input terminal 252 is directly electrically coupled to respective jumper plug output terminal 254 as illustrated by the jumper plug interconnect lines 256. The jumper plug 250 is coupleable to the connector port 224 to provide a constant electrical connection between the driver output 236 and the light emitting unit input 240. The jumper plug input terminals 252 are coupleable to the connector port output terminals 232. The jumper plug output terminals 254 are coupleable to the connector port input terminals 230. Accordingly, the jumper plug 250 is configured to provide unmodulated power from the driver output 236 to the light emitting unit input 240.

A method of adding modulation capabilities to the light fixture 220 includes the steps of unplugging the jumper plug 250 from the connector port 224 and plugging the modulator 210 into the connector port 224. As previously mentioned, the connector port 224 electrically isolates the driver 226 from the light emitting unit 228. The jumper plug 250 directly electrically couples the driver 226 and the light emitting unit 228 to provide unmodulated power to the light emitting unit 228. The modulator 210 receives unmodulated power from the driver 226 and provides modulated power to the light emitting unit 228.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A light fixture coupleable to a track power system, the light fixture comprising:
    a housing mechanically couple able to the track power system;
    a connector port coupled to the housing, the connector port having input terminals and output terminals, the connector port configured to electrically isolate the input terminals from the output terminals;
    a driver positioned within the housing, the driver having a driver input and a driver output, the driver input electrically coupleable to the track power system and configured to receive an input voltage from the track power system, the driver output coupled to the output terminals of the connector port; and
    a light emitting unit coupled to the housing, the light emitting unit having a light emitting unit input coupled to the input terminals of the connector port.

2. The light fixture of claim 1, wherein the connector port is configured to selectively receive one of a light modulator or a jumper plug to couple the input terminals to the output terminals.

3. The light fixture of claim 2, wherein:
    the jumper plug includes jumper plug input terminals and jumper plug output terminals; and
    each jumper plug input terminal is coupled to a respective jumper plug output terminal.

4. The light fixture of claim 2, wherein the jumper plug is configured to provide a constant electrical connection between the driver and the light emitting unit.

5. The light fixture of claim 2, wherein the modulator includes a modulator input coupled to the output terminals and a modulator output coupled to the input terminals, the modulator input configured to receive electrical power from the driver output, and the modulation output configured to provide modulated electrical power to the light emitting unit.

6. The light fixture of claim 2, wherein the modulator is configured to modulate light emitted from the light emitting unit.

7. The light fixture of claim 2, wherein the modulator is directly coupled to the connector port.

8. The light fixture of claim 2, wherein the modulator is coupled to the connector port via a cable.

9. The light fixture of claim 2, wherein the modulator is mechanically supported by the track lighting system.

10. A lighting system with modulation capabilities comprising:
    a light fixture having a connector port coupled to a set of driver output terminals and to a set of load input terminals, the connector port configured to electrically isolate the driver output terminals from the load input terminals; and
    a modulator coupleable to the connector port, the modulator configured to receive unmodulated power from the driver output terminals and to provide modulated power to the load input terminals.

11. The lighting system of claim 10, wherein the modulator is removable and replaceable with a jumper plug, the jumper plug configured to provide unmodulated power from the driver output terminals to the load input terminals.

12. The lighting system of claim 11, wherein the jumper plug includes a set of jumper plug input terminals and a set of jumper plug output terminals, each jumper plug input terminal directly electrically connected to a respective jumper plug output terminal.

13. The lighting system of claim 12, wherein the jumper plug input terminals are coupleable to the driver output terminals at the connector port, and the jumper plug output terminals are coupleable to the load input terminals at the connector port.

14. The lighting system of claim 10, wherein the modulator has a set of modulator input terminals coupleable to the driver output terminals and a set of modulator output terminals coupleable to the load input terminals.

\* \* \* \* \*